Feb. 19, 1929.　　　　　　　　　　　　　　　　　1,702,508
K. L. HERRMANN
APPARATUS FOR PICKING COTTON
Filed March 1, 1926　　　　2 Sheets-Sheet 1
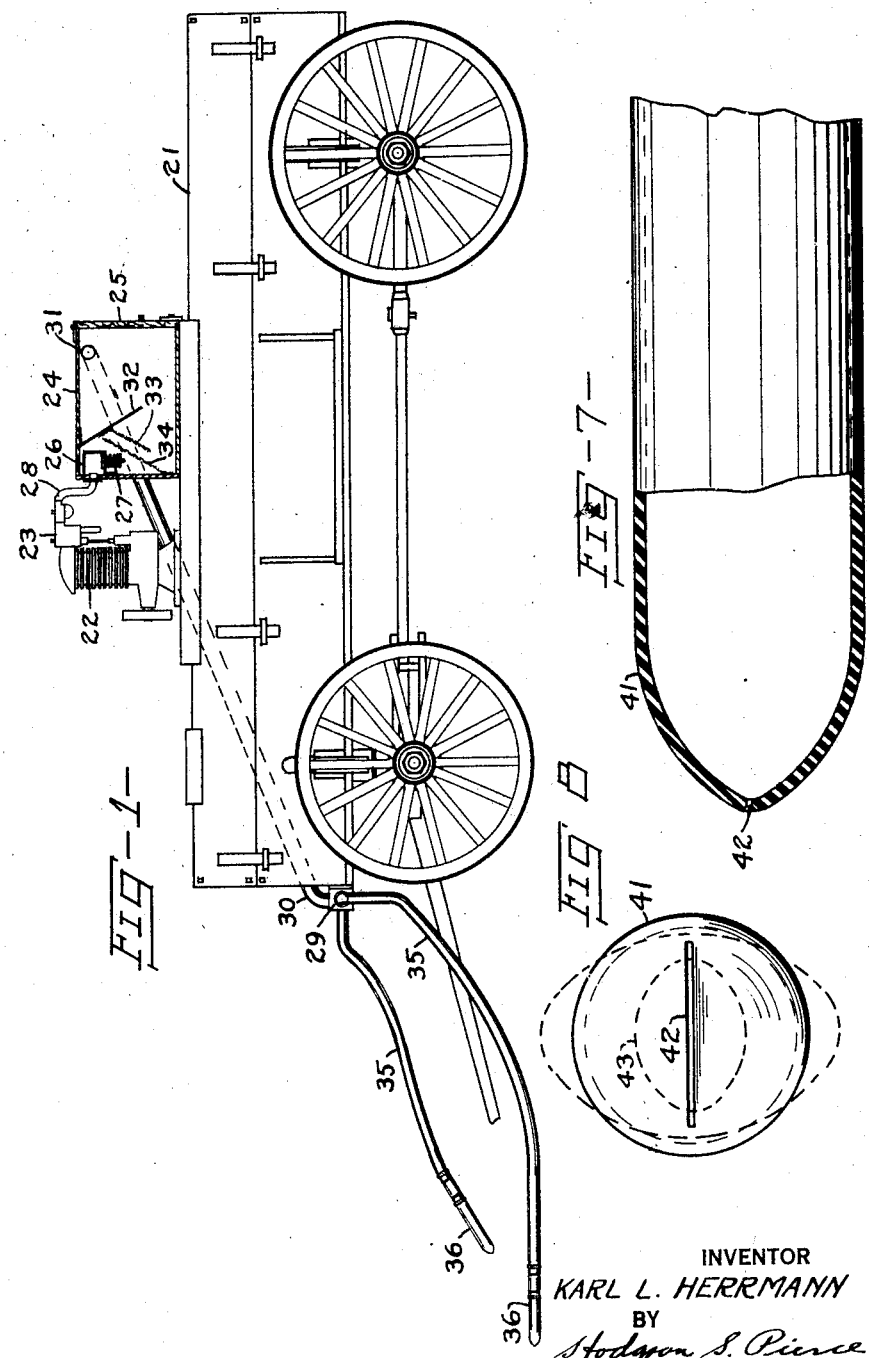
INVENTOR
KARL L. HERRMANN
BY
Hodgson S. Pierce
ATTORNEY Feb. 19, 1929.　　　　　　　　　　　　　　　　　　1,702,508
K. L. HERRMANN
APPARATUS FOR PICKING COTTON
Filed March 1, 1926　　　　2 Sheets-Sheet 2
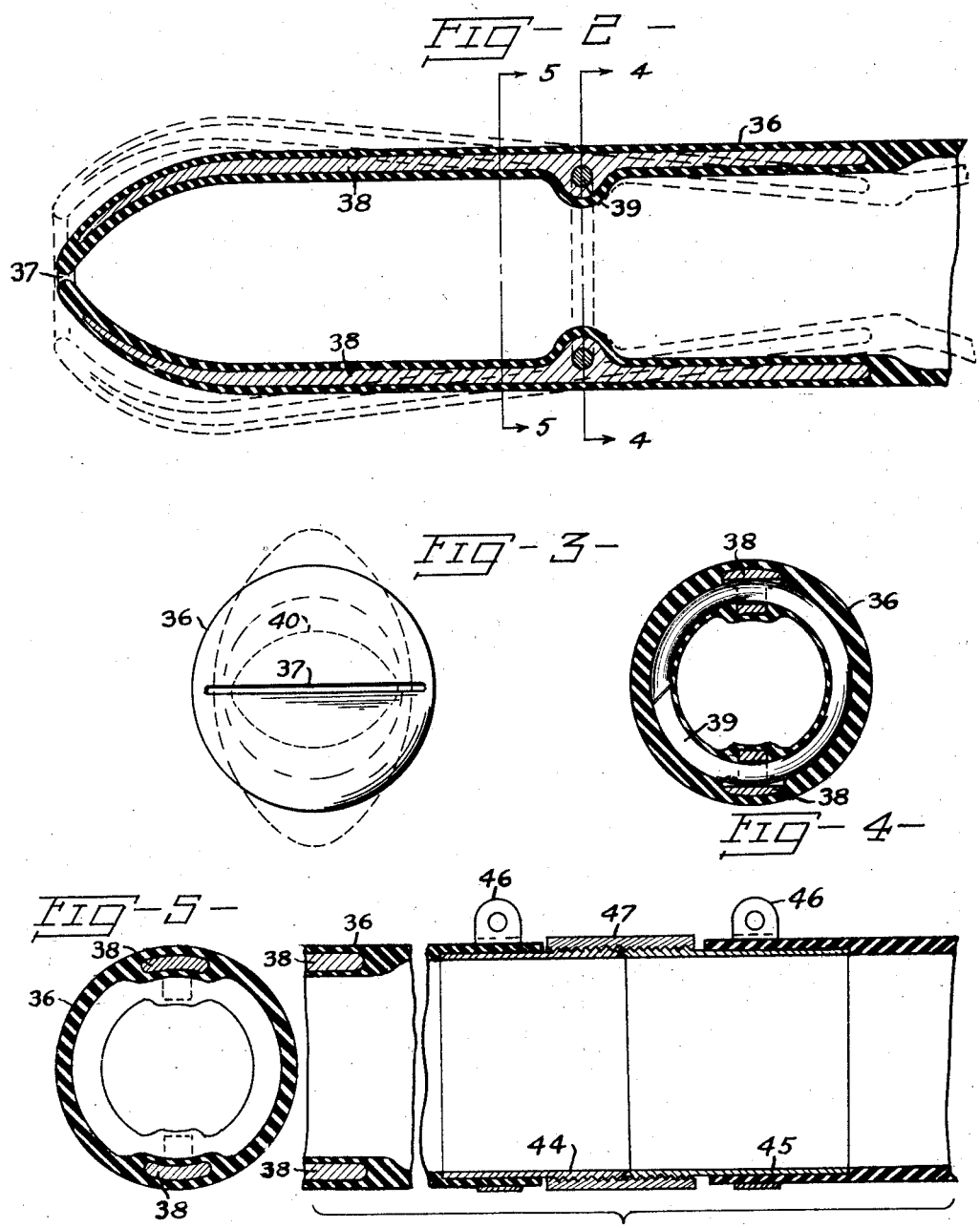
INVENTOR
KARL L. HERRMANN
BY
ATTORNEY Patented Feb. 19, 1929.

1,702,508

UNITED STATES PATENT OFFICE.

KARL L. HERRMANN, OF DETROIT, MICHIGAN.

APPARATUS FOR PICKING COTTON.

Application filed March 1, 1926. Serial No. 91,485.

This invention relates to improvements in apparatus for picking cotton and has for its principal object the provision of new and novel means whereby cotton may be picked with greater speed and ease.

Another object is to provide a suction means for picking cotton wherein the suction is obtained from the carburetor inlet opening of an internal combustion engine.

Another object is to provide an apparatus for picking cotton comprising a baffled container operatively connected to the carburetor inlet of an internal combustion engine, suitable flexible connections terminating in cotton picking nozzles extending from the container so as to be operable within a predetermined radius from the container.

Another object is to provide a container as referred to above in which a plurality of baffles are arranged between the nozzle connection openings and the opening leading to the carburetor inlet.

Another object is to provide a container as referred to above in which the opening leading to the carburetor inlet is provided with a spring balanced check valve.

Another object is to provide a deformable walled cotton picking nozzle.

Another object is to provide a deformable walled cotton picking nozzle having a closed end provided with a slit, said slit being capable of being transformed into an opening upon proper deformation of the walls of said nozzle.

Another object is to provide a nozzle as described above of such a construction that a vacuum or partial vacuum within the nozzle tends to close the said slit.

A further object is to provide a deformable walled cotton picking nozzle as described above in which suitable metallic parts are embodied whereby the said slit may be transformed into an opening by pressure applied to said nozzle at a point remote from the end thereof.

The above being among the objects of the present invention the same consists of certain features of construction and combination of parts to be hereinafter described, and then claimed, having the above and other objects in view.

In the accompanying drawings which illustrate a suitable embodiment of the present invention, and in which like numerals refer to like parts throughout the several different views, Fig. 1 is a more or less diagrammatic view of the apparatus going to make up the present invention mounted upon a wagon.

Fig. 2 is an enlarged longitudinal sectional view taken axially of one of the nozzles shown in the apparatus in Fig. 1.

Fig. 3 is an end view of the nozzle shown in Fig. 2.

Fig. 4 is a transverse sectional view of the nozzle of Fig. 2 taken on the line 4—4 of Fig. 2.

Fig. 5 is a transverse sectional view of the nozzle of Fig. 2 taken on the line 5—5 of Fig. 2.

Fig. 6 is an enlarged longitudinal sectional view taken through the connection between the nozzle and its connected tube, showing parts of each.

Fig. 7 is a fragmentary partly broken side view of a modified form of nozzle.

Fig. 8 is an end view of the modified nozzle of Fig. 7.

In the present invention a construction is provided that offers an extremely simple yet effective apparatus for picking of cotton and requires but few and simply designed parts.

In accordance therewith I show in Fig. 1 a wagon 21 upon which is mounted an internal combustion engine 22 having a carburetor 23. Behind the engine 22 is mounted a box 24 closed by a removable substantially air-tight cover 25. Within the box 24 and against its forward face is secured a smaller box 26 provided with an opening leading into the interior of the box 24 controlled by an adjustable spring loaded check valve 27 adapted to uncover the opening upon sufficient suction being created within the box 26, and the interior of the smaller box 26 is connected to the inlet opening of the carburetor 23 by a tube 28. A suction header 29 secured to the forward end of the wagon 21, or to any other suitable and convenient place on the wagon 21, is connected to the box 24 by a tube 30 which preferably communicates with the interior of the box 24 at a point remote from the smaller box 26 such as at the point 31 near the cover 25. Suitable baffles such as the solid baffle 32 and screens 33 and 34 are preferably provided between the point 31 and the smaller box 26 for separating the cotton being picked from the current of air carrying it, and for preventing any cotton from being drawn into the engine 22. A suitable number of flexible tubes such as 35, terminating in nozzles 36, are secured to the suction header 29 and may be of such length as to be capable of covering a suitable area around the wagon 21.

The operation of the device will be readily apparent. When the engine 22 is running a suction will be created in the carburetor which will be communicated to the interior of the small box 26. When the suction in the small box 26 has attained a predetermined value the check valve 27 will raise and the suction will be transmitted through the box 24, tube 30, header 29 and tubes 35 to the nozzle 36. As will be described later the ends of the nozzles 36 are normally closed and are capable of being opened, and when presented to a boll of cotton and opened the cotton is at once sucked into the nozzle 36 and passes through the tube 35, header 29, and tube 30 into the box 24 where it is deposited. The cover 25 must be periodically opened and the cotton which has accumulated in the box 24 removed into the body of the wagon 21 or other suitable place.

Instead of using an engine such as 22 mounted on a wagon 21, it will be apparent that an automobile may be used, in which case the engine used to drive the automobile may also be employed to provide the suction, the tube 28 in such case being connected to the inlet opening of its carburetor. It will also be evident that unless provided for, the restriction of the air entering the carburetor by the apparatus connected to it may seriously interfere with the proper proportion of fuel and air supplied by the carburetor, the tendency being to increase the proportion of fuel with an increase in suction. This may be taken care of, in a conventional manner by sealing the fuel tank (not shown) and communicating the air space therein with the suction side of the carburetor, thereby automatically compensating for any change in the suction in the carburetor. A suitable form of governing means (not shown) is also preferably provided for maintaining the speed of the engine so as to produce a uniform suction at the nozzles 36, altho the check valve 27 will answer for this purpose for ordinary operation.

The construction of the nozzles 36 constitutes an important part of the present invention. Referring now to Figures 2 to 6 inclusive, in which a preferable form of nozzle constructed in accordance with the present invention is shown, it will be noted that the nozzle 36 is provided with walls of rubber or other flexible material, that may or may not be suitably reinforced by a flexible fabric as is deemed desirable or necessary. The walls of the nozzle 36 converge at their forward end to form a slit such as 37, the slit 37 being normally closed due to the suction within the nozzle 36 which tends to draw the walls or lips thereof together. Preferably moulded within the walls of the nozzle 36 are two relatively long and narrow metal members 38 disposed on opposite sides of the slit 37 and extending from a point adjacent the slit 37 rearwardly. These members 38 are pivotally supported on a metal ring 39 also moulded within the walls of the nozzle 36, the ring 39 being positioned at a point rearwardly of the center of the members 38 so that the pressure transmitted to the members 38, due to the tendency of the walls of the nozzle 36 to be deformed by the suction, will be greater forwardly of the ring 39, and will thus aid in normally holding the lips of the slit 37 in closed position. In operation, the nozzle 36 is grasped by the hand of the operator adjacent the rear ends of the members 38 and presented to the boll of cotton. The operator then squeezes the nozzle 36 which moves the rear ends of the member 38 towards each other and causes the forward ends thereof to move apart as indicated by dotted lines in Fig. 2. When the forward ends of the members 38 thus must move apart the lips of the slit 37 are separated and the slit 37 is distorted to present an opening as indicated by the dotted lines 40 in Fig. 3, which opening allows the air to rush into the nozzle and draws the cotton with it. The operator then releases the pressure on the nozzle and it resumes its normal position with the lips of the slit 37 in contacting relation.

The members 38 may be made of such length that the operator of the nozzle may stand erect and operate the same, thus relieving him from the usually tiring stooping over usually associated with this class of work.

A modification of the nozzle 36 is shown in Figures 7 and 8 (Sheet 1). In this modification a flexible walled nozzle 41 terminating in a closed end provided with a slit 42 is provided, similar to the nozzle 36, but in this modification no metallic members are employed, the operator grasping the nozzle 41 adjacent its closed end and squeezing it longitudinally of the slit 42 to cause the slit to open to form an opening, as indicated by the dotted lines 43 in Fig. 8. The resiliency of the walls and the action of the suction in the nozzle cause the lips of the slit 42 to return to closed contacted position upon release of pressure in this case.

The nozzles may be secured to the tubes 35 in any convenient manner. In Fig. 6 is shown one manner in which this may be accomplished and comprises externally threaded sleeves 44 and 45 partially received within the open ends of the nozzle 36 and tube 35 respectively and held in place therein by a conventional form of adjustable hose clamp 46. The sleeves 44 and 45 are then threaded into a common internally threaded sleeve 47 which securely holds them together in airtight relationship.

The suction within the nozzle 36 tends to collapse the walls thereof, and this tendency has the effect of applying more pressure to the rear end of the member 38 than the length of the members 38 forwardly and rearwardly of the pivot ring 39 would apparently indicate. This tendency is overcome and, in fact, made use of, by making the sleeve 44 axially slidable within the nozzle 36. In practice the sleeve 45 is adjusted axially within the nozzle 36 to a point where, because of its supporting effect on the walls thereof the nozzle may be operated by minimum effort on the part of the operator, yet not beyond a point where the suction within the tube will effectively seal the lips of the slot 37. When the sleeve 45 is adjusted to this position it is locked to the nozzle 36 by the clamp 46 as previously described.

It will be obvious that the nozzles described are adaptable for use in connection with any suitable type of suction producing means, and in the present invention their use is not restricted to the single type of suction producing means shown.

Formal changes may be made in the specific embodiment of the invention described without departing from the spirit and substance of the broad invention, the scope of which is commensurate with the appended claims.

What I claim is:—

1. A nozzle for a cotton picker comprising a member provided with resilient walls and terminating in a slotted self-closing end constituting the intake end of said nozzle.

2. A nozzle for a suction type cotton picking machine comprising a generally cylindrically shaped hollow member provided with resilient walls, the walls of said member converging at one end thereof to form a slit, and means independent of suction within said nozzle operable to separate the lips of said slit to form an opening, said slitted end constituting the intake end of said nozzle.

3. A nozzle for a cotton picking machine comprising a flexible walled hollow member the walls of which converge at the intake end thereof to form a terminal slit, and rigid members operatively connected to said flexible walls for transmitting pressure to said end for the purpose of deforming the same.

4. A nozzle for a cotton picking machine comprising a hollow member provided with flexible walls converging at the intake end thereof to form a slit, and rigid members embodied in said walls for transmitting pressure to said end from a point remote therefrom for the purpose of separating the lips of said slit.

5. A nozzle for cotton picking machines comprising a hollow member provided with flexible walls converging at one end thereof to form a normally closed slit, a longitudinally extending member imbedded in said walls on each side of said slit, and means for pivotally supporting said longitudinally extending members between their ends.

6. A nozzle for cotton picking machines comprising a deformable walled hollow member, the walls at one end thereof converging to form a slitted tip, and longitudinally extending rigid members secured to said walls on each side of said slit, said rigid members being pivotally supported rearwardly of the center thereof.

7. A nozzle for a suction type cotton picker, comprising a hollow member normally adapted to be under suction and provided with a flexible normally closed intake end provided with a slit therethrough, said suction within said nozzle acting on the walls thereof to normally hold the lips of said slit in contacting relationship.

8. A nozzle for a suction type cotton picker, comprising a hollow member adapted to be under constant suction, said member being provided with flexible walls terminating in a self-closing slitted intake end deformable under manual pressure, said slit being deformed upon deformation of said end.

9. A nozzle for a suction type cotton picking machine comprising a generally cylindrically shaped hollow member provided with resilient walls, the walls of said member converging at the intake end thereof to close the same, said end being manually deformable and provided with a self-closing mouth.

10. A nozzle for a suction type cotton picking machine comprising a hollow member terminating in a closed intake end, said nozzle formed of a self-sustaining manually deformable material, and a self-closing mouth in said end comprising a slit extending through the walls of said end.

11. A nozzle for a suction type cotton picking machine comprising a hollow member provided with a normally closed intake end, said end being deformable and provided with a self-closing slit self-sustaining under normal suction within said nozzle.

12. A nozzle for a suction type cotton picking machine formed of self-sustaining resilient material readily deformable under manual pressure, said nozzle comprising a hollow member the walls adjacent the picking tip thereof converging to form a normally closed end provided with a self-closing slit, said resilient walls allowing said slit to be temporarily transformed into an opening upon manual pressure applied thereto.

Signed by me at Detroit, Michigan, U.S.A., this 26 day of Feb., 1926.

KARL L. HERRMANN.